United States Patent
Sugawara et al.

(10) Patent No.: US 6,845,934 B2
(45) Date of Patent: Jan. 25, 2005

(54) ROTOR BRAKING DEVICE FOR SPINNING REEL

(75) Inventors: Ken'ichi Sugawara, Osaka (JP); Itsuo Someya, Hannan (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/645,624

(22) Filed: Aug. 22, 2003

(65) Prior Publication Data

US 2004/0041044 A1 Mar. 4, 2004

(30) Foreign Application Priority Data

Aug. 28, 2002 (JP) .......................................... 2002-249255
Mar. 26, 2003 (JP) .......................................... 2003-084896

(51) Int. Cl.[7] ............................................... A01K 89/01
(52) U.S. Cl. ........................................................ 242/231
(58) Field of Search ................................. 242/230–233

(56) References Cited

U.S. PATENT DOCUMENTS

| 4,238,085 | A | * | 12/1980 | Jansson et al. | ............. | 242/282 |
|---|---|---|---|---|---|---|
| 4,337,905 | A | * | 7/1982 | Sazaki | ......................... | 242/232 |
| 5,662,283 | A | * | 9/1997 | Puryear et al. | ............. | 242/233 |
| 5,820,051 | A | * | 10/1998 | Takeuchi et al. | ............ | 242/232 |
| 6,371,395 | B2 | * | 4/2002 | Sato | ............................. | 242/232 |
| 6,382,542 | B1 | * | 5/2002 | Sato | ............................. | 242/243 |
| 6,609,670 | B2 | * | 8/2003 | Sato | ............................. | 242/231 |
| 6,691,940 | B2 | * | 2/2004 | Katayama et al. | .......... | 242/232 |
| 6,729,568 | B2 | * | 5/2004 | Hirayama et al. | .......... | 242/232 |

FOREIGN PATENT DOCUMENTS

| EP | 1149529 A1 | 10/2001 |
|---|---|---|
| EP | 1323344 A2 | 7/2003 |
| JP | 10-4839 A | 1/1998 |
| JP | 2000-093052 A | 4/2000 |
| JP | 2000-125712 A | 5/2000 |

* cited by examiner

Primary Examiner—Emmanuel Marcelo
(74) Attorney, Agent, or Firm—Shinjyu Global IP Counselors, LLP

(57) ABSTRACT

A rotor braking mechanism brakes a rotor when a bail arm pivots into the line-releasing position, and includes a moving member and a braking member mounted on a mounting groove formed on the base end of a cylindrical portion. The braking member includes first and second braking members, both of which are made from an elastic material and are approximately semi-circular in shape. The first braking member and the second braking member are press fitted onto the circular mounting groove by a spring member mounted on a groove formed in the outer periphery of the first and second braking members. The braking member includes a drag portion that frictionally and rotatably engages with the mounting groove, and a plurality of engaging portions that engage with the rear end portion of the moving member. With this configuration, the braking force of a rotor braking device is stabilized.

19 Claims, 14 Drawing Sheets (a)

(b)

ROTOR BRAKING DEVICE FOR SPINNING REEL

BACKGROUND OF THE INVENTION

1. Field of the Invention

The present invention generally relates to a rotor braking device. More specifically, the present invention relates to a spinning reel rotor braking device that brakes a rotor, which is rotatively mounted on a reel unit of the spinning reel, in response to the pivoting of a bail arm, which pivots between a line-winding position and a line-releasing position.

2. Background Information

A rotor on a spinning reel is typically provided with a bail arm for guiding fishing line to a spool. The bail arm can assume a line-winding position, in which the fishing line is guided to the peripheral surface of the spool as the fishing line is being wound, and a line-releasing position, in which the bail arm is pivoted from the line-winding position so that it poses no hindrance when the fishing line is reeled out the spool during casting. The rotor is provided with a bail tripping device. The bail tripping device maintains the bail arm in the line-winding position and the line-releasing position, and returns the bail arm from the line-releasing position to the line-winding position when the rotor rotates in the line-winding direction.

A conventional bail tripping device is disclosed in Japanese Published Patent Application H10-4839. This bail tripping device includes a toggle spring, a rod-shaped member, and a switching projection. The toggle spring is mounted to the rotor whose front end is interlocked with the bail arm in the vicinity of the pivot center thereof. The rod-shaped moving member has a front end that is interlocked with the bail arm in the vicinity of the pivot center thereof and a base end that moves back and forth with respect to the reel unit. The switching projection is provided on the reel unit so as to contact the moving member. The toggle spring toggles and biases the bail arm into two positions, and maintains the bail arm in these two positions. When the bail arm is pivoted into the line-releasing position, the moving member retreats to a position in which it contacts the switching protrusion. Then, when the rotor rotates in the line-winding direction, the moving member contacts the switching protrusion and pushes it forward, the toggle spring contracts due to this forward advancement, and the toggle spring returns the bail arm to the line-winding position.

A spinning reel having improved rotational transmission efficiency can be rotated easily in the line-winding direction. When the rotor rotates, the rotational orientation thereof tends to shift easily, even when the rotor has been rotated into a rotational orientation suitable for casting or thumbing.

In this conventional configuration, a braking member which contacts the reel unit and brakes the rotor is mounted on the moving member in order to prevent the rotation of the rotor in the line-releasing position. When the moving member is moved into the contact position, the braking member contacts the front surface of the reel unit and is compressed, thus braking the rotor. When the rotor is elastically braked like this and the bail is tripped, the rotor can be prevented from rotating and can also be rotated in the line-winding direction when necessary.

In this conventional configuration, the braking member is mounted to the moving member, and the rotor is braked by bringing the braking member into contact with the reel unit and compressing the braking member. Therefore, if the contact position of the moving member were to vary from front to back due to manufacturing or assembly errors, the amount of compression of the braking member would vary as well. If the amount of compression changes, the braking force on the rotor will also change, and thus the rotor cannot be braked smoothly. Accordingly, it has been considered providing an annular braking member on the reel unit, and moving the moving member in a direction perpendicular to the compression direction of the braking member from the end of the braking member towards an outer lateral surface, thereby bringing the moving member into contact with the braking member.

However, there are concerns that this configuration will produce irregularities in the braking force and make the braking force unstable because the moving member comes into contact with only one portion of the braking member. If the braking force becomes unstable like this, there are concerns that a consistent amount of braking force will not be produced, which in turn will give rise to a decrease in operability.

In view of the above, there exists a need for a rotor braking device for a spinning reel that overcomes the above mentioned problems in the prior art. This invention addresses this need in the prior art as well as other needs, which will become apparent to those skilled in the art from this disclosure.

SUMMARY OF THE INVENTION

An object of the present invention is to stabilize the braking force of a rotor braking device in a spinning reel.

A rotor braking device for a spinning reel in accordance with a first aspect of the present invention brakes a rotor that is rotatably mounted on a reel unit of the spinning reel in response to a pivoting of a bail arm that pivots between a line-winding position and a line-releasing position. The rotor braking device has a moving member that is coupled to the bail arm, and a braking member. The moving member is provided on the rotor, and movable between a first position that corresponds to the line-winding position and a second position that corresponds to the line-releasing position. A part of the moving member projects toward the reel unit when the moving member is in the second position. The braking member has a drag portion and a plurality of engagement portions. The drag portion frictionally and rotatably engages with the reel unit. The plurality of engagement portions engages with the projecting part on the moving member when the moving member is moved to the second position. Further, the drag portion frictionally engages with the reel unit when the projection on the moving member engages with the projecting part.

In this rotor braking device, when the bail arm pivots from the line-winding position to the line-releasing position, a portion of the moving member provided on the rotor projects toward a front portion of the reel unit and engages with the engagement portions provided on the braking member. Then, when the rotor and the braking member rotate, the rotor is braked because the drag portion frictionally engages with the front portion of the reel unit. Here, since the drag portion frictionally engages with the front portion of the reel unit and allows rotation, braking will not occur on only a portion of the reel unit, as in the prior art. In addition, since the drag portion uniformly brakes the reel unit over its entire portion, the braking force can be stabilized.

A rotor braking device of a spinning reel in accordance with a second aspect of the present invention is the rotor braking device of the first aspect, in which the braking member is annular in shape, the drag portion is formed on the inner periphery of the braking member, and the engagement portions are formed on the outer periphery of the braking member. In this situation, braking force can be reliably obtained by the annular braking member mounted on the outer peripheral surface of the reel unit, and the drag portion formed on the inner peripheral surface of the braking member.

A rotor braking device of a spinning reel in accordance with a third aspect of the present invention is the rotor braking device of the second aspect, in which the braking member is made of a plurality of constituent members, and the plurality of constituent members is press fitted to the reel unit by a spring member. In this situation, a braking member having of a plurality of members can easily obtain braking force by, for example, inserting a coil spring member in a groove formed in the outer periphery of the braking member.

A rotor braking device of a spinning reel in accordance with a fourth aspect of the present invention is the device of any of the aforementioned aspects, in which the moving member is rod-shaped. Further, the front end of the rod-shaped moving member is bent toward the vicinity of the pivot center of the bail arm such that the front end extends along the pivot axis of the bail arm and is rotatably supported by the bail arm. Moreover, the rear end of the moving member is bent toward the rotational axis of the rotor and is supported by the rotor so as to be movable back and forth. Finally, a portion of the moving member between the front and rear ends is disposed so as to extend along the rotational axis of the rotor. In this situation, the pivoting motion of the bail arm can be easily converted with a simple configuration of back and forth linear motion of the projecting part of the moving member.

A rotor braking device of a spinning reel in accordance with a fifth aspect of the present invention is the device of the first aspect, in which the braking member is made of an elastic annular member which has a cut out portion. The braking member is press fitted to the reel unit by the elasticity of the annular member. In this arrangement, the attachment and removal of the braking member will be made easy by using an annular member formed, for example, into an approximate C-shape. Further, braking force can be easily obtained by the elasticity of the annular member.

A rotor braking device of a spinning reel in accordance with a sixth aspect of the present invention is the device of the fifth aspect, in which the braking member further includes an elastic annular plate spring and a plurality of projections. The drag portion of the elastic annular plate spring is formed on the inner periphery of the plate spring. The plate spring has a cut out portion. The plurality of projections is provided on the outer periphery of the plate spring and extends radially outward therefrom. Further, the projections form engagement portions. In this situation, the braking member includes a plate spring and a plurality of projections. The plate spring is formed, for example, into an approximate C-shape. The projections are provided on the outer circumference of the plate spring. Here, for example, by integrally forming the plurality of projections with a plate spring, the braking member can be easily formed by, for example, press forming one member. Thus, the overall number of parts can be reduced.

A rotor braking device of a spinning reel in accordance with a seventh aspect of the present invention is the device of the sixth aspect, in which each of the plurality of projections include a first bent portion and a second bent portion. The first bent portion is a portion that is bent radially outward at an outer periphery of the plate spring. The second bent portion is a portion bent from a tip of the first bent portion to extend along a rotational shaft of the rotor. In this arrangement, by forming the braking member into an approximate C-shape in cross-section, the projection on the braking member can easily engage with the engagement portions.

The rotor braking device of a spinning reel in accordance with an eighth aspect of the present invention is the device of the seventh aspect, further including an annular washer member that is disposed between the braking member and the reel unit. The tips of the first bent portions are formed such that they are bent toward the reel unit when the braking member is mounted on the reel unit. In this arrangement, even when, for example, the reel unit is formed from two members and an uneven portion is produced at a point in which the two members are joined, mounting the washer member between the braking member and the reel unit can prevent the first bent portions from getting caught on the uneven portion.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
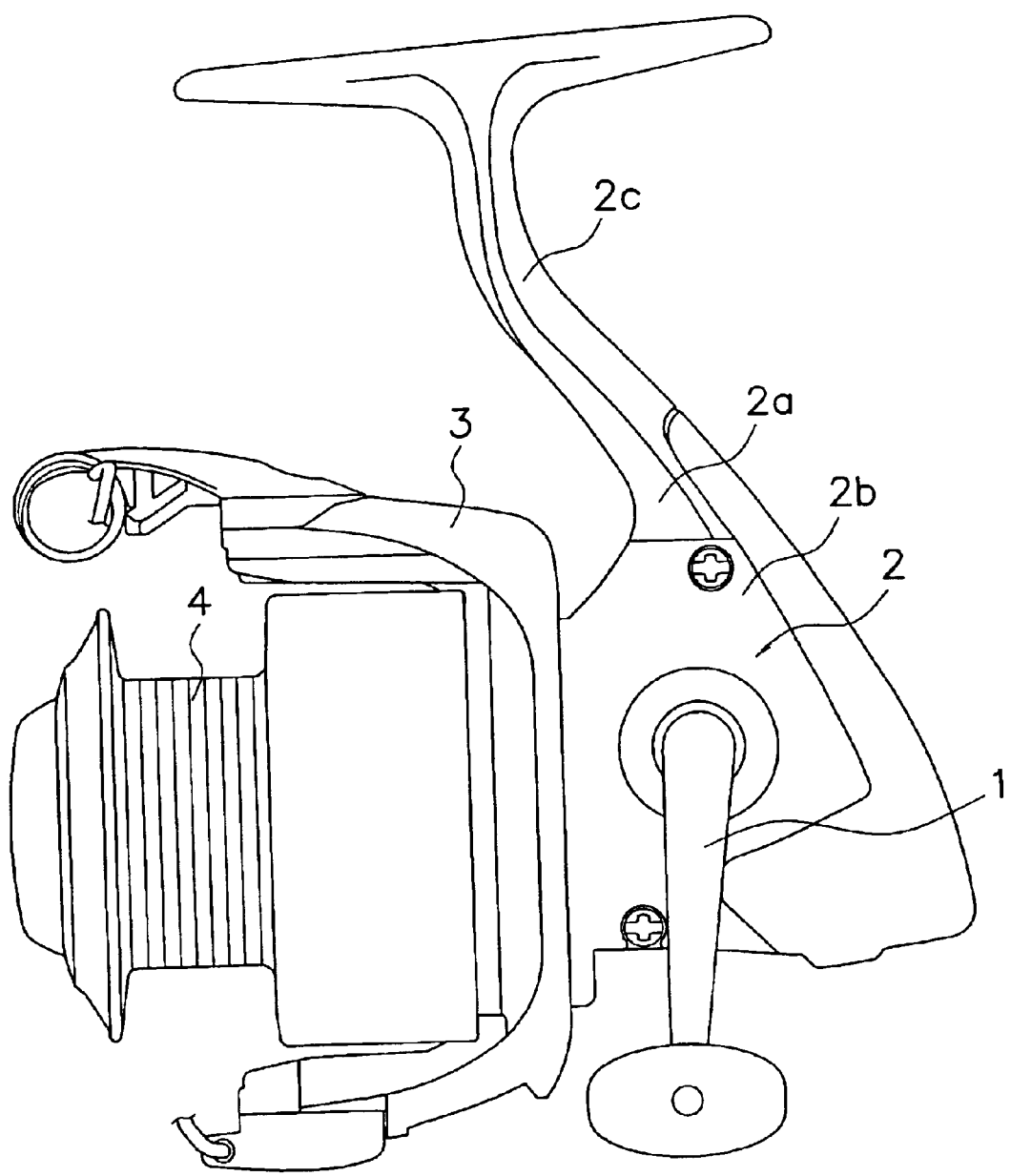
FIG. 1 is a left side elevational view of a spinning reel in accordance with a preferred embodiment of the present invention.
Figure 2:
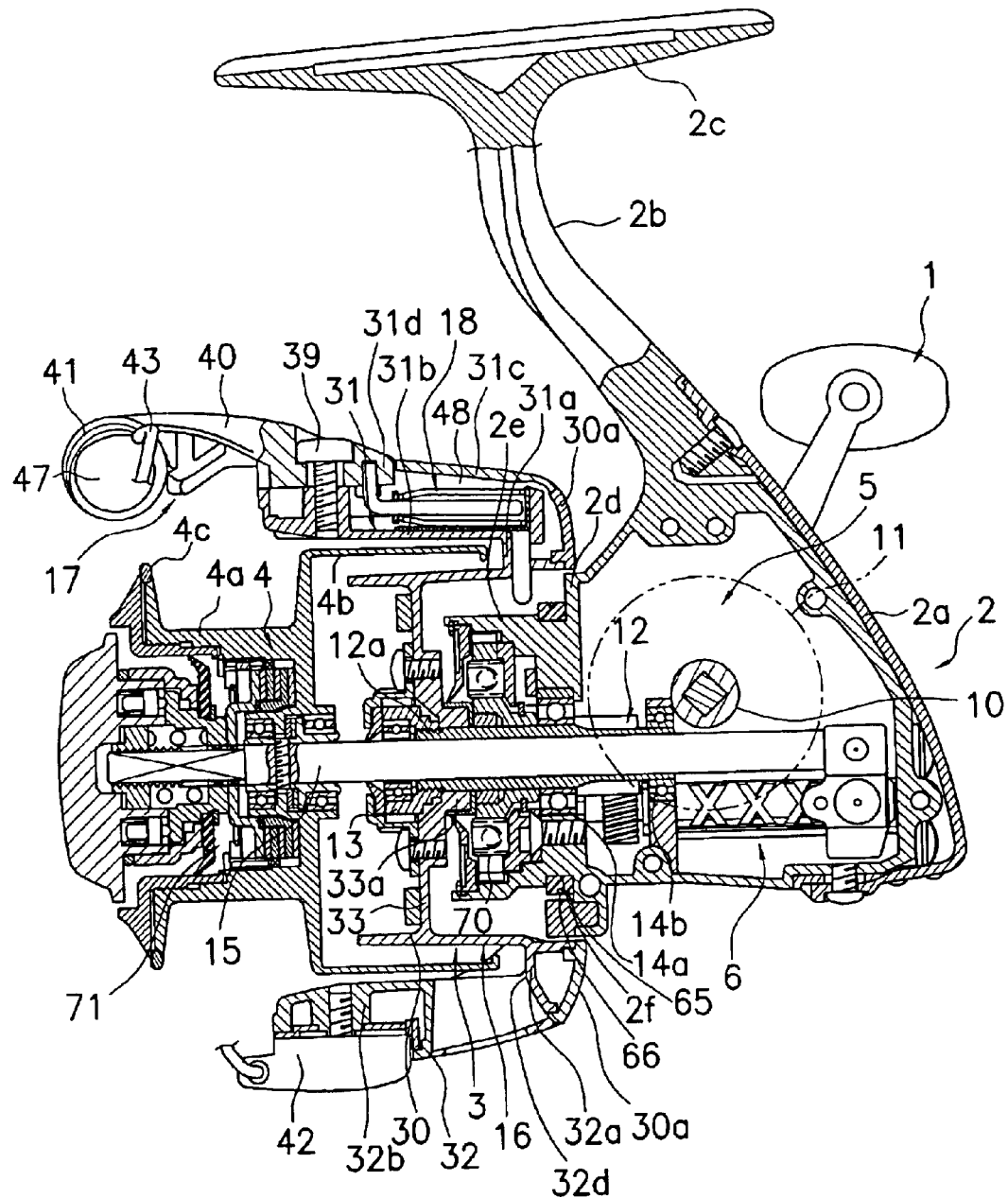
FIG. 2 is a left side cross-sectional view of the spinning reel in accordance with the preferred embodiment of the present invention.

As shown in FIGS. 1 and 2, a spinning reel in accordance with a preferred embodiment of the present invention includes a handle 1, a reel unit 2 that rotatably supports the handle 1, a rotor 3, and a spool 4. The rotor 3 is rotatively supported at the front of the reel unit 2. The spool 4 is configured to accommodate fishing line wound around the outer peripheral surface thereof. The spool 4 is disposed at the front of the rotor 3 so that it can be freely moved forward and backward relative to the rotor 3. Note that the handle 1 is mounted on the left side of the reel unit 2 in FIG. 1, and on the right side thereof in FIG. 2. Thus, the handle 1 can be mounted on either the left or the right hand side of the reel body 2.

The reel unit 2 includes a reel body 2a having a space in the interior thereof, and a lid member 2b mounted detachably to the reel body 2a which serves to enclose the space in the interior of the reel body 2a.

Figure 5:
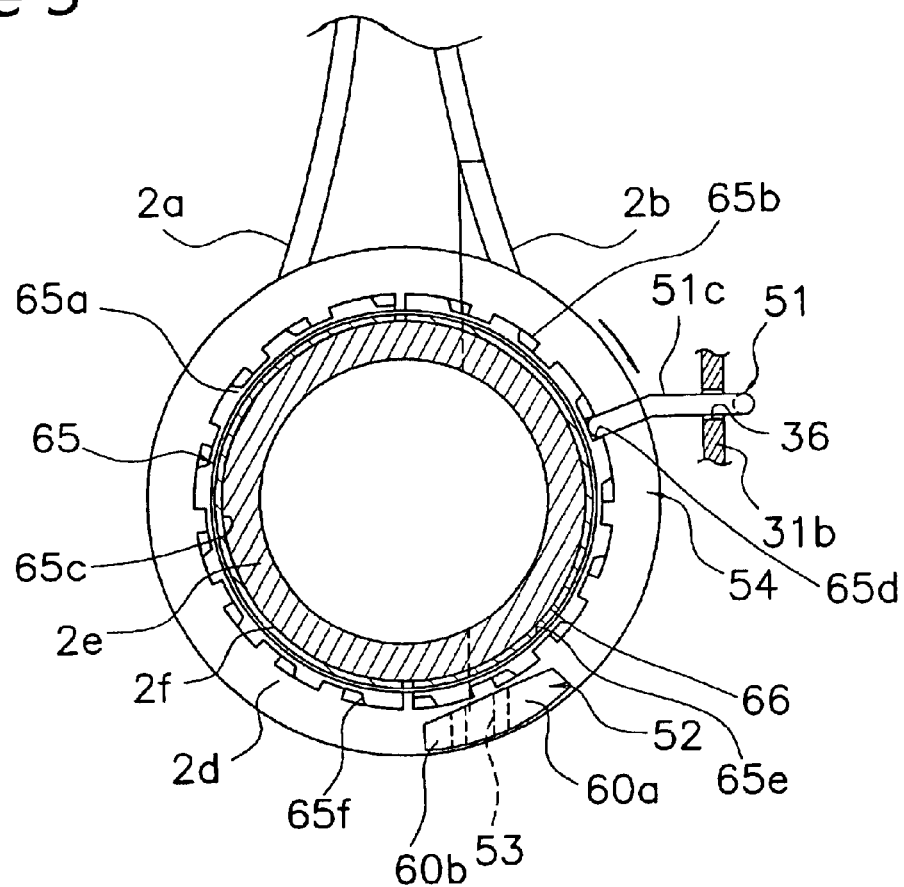
FIG. 5 is a cross-sectional front elevational view of the reel body illustrating a bail tripping mechanism in accordance with the preferred embodiment of the present invention.

The reel body 2a is made of, for example, an aluminum alloy, and is formed integrally with a T-shaped rod attachment leg 2c on the top of the reel body 2a that extends horizontally. As shown in FIG. 2, the space in the reel body 2a accommodates a rotor drive mechanism 5 and an oscillation mechanism 6. The rotor drive mechanism 5 transmits the rotation of the handle 1 to rotate the rotor 3. The oscillation mechanism 6 uniformly winds the fishing line onto the spool 4 by moving the spool 4 back and forth relative to the reel body 2a. A circular flange portion 2d and a cylindrical portion 2e are formed on the front of the reel body 2a and the lid member 2b. The cylindrical portion 2e is open to the front and its diameter is smaller than that of the flange portion 2d. As shown in FIG. 5, a mounting groove 2f that is circular in a cross-sectional view is formed in the cylindrical portion 2e.

Figure 6:
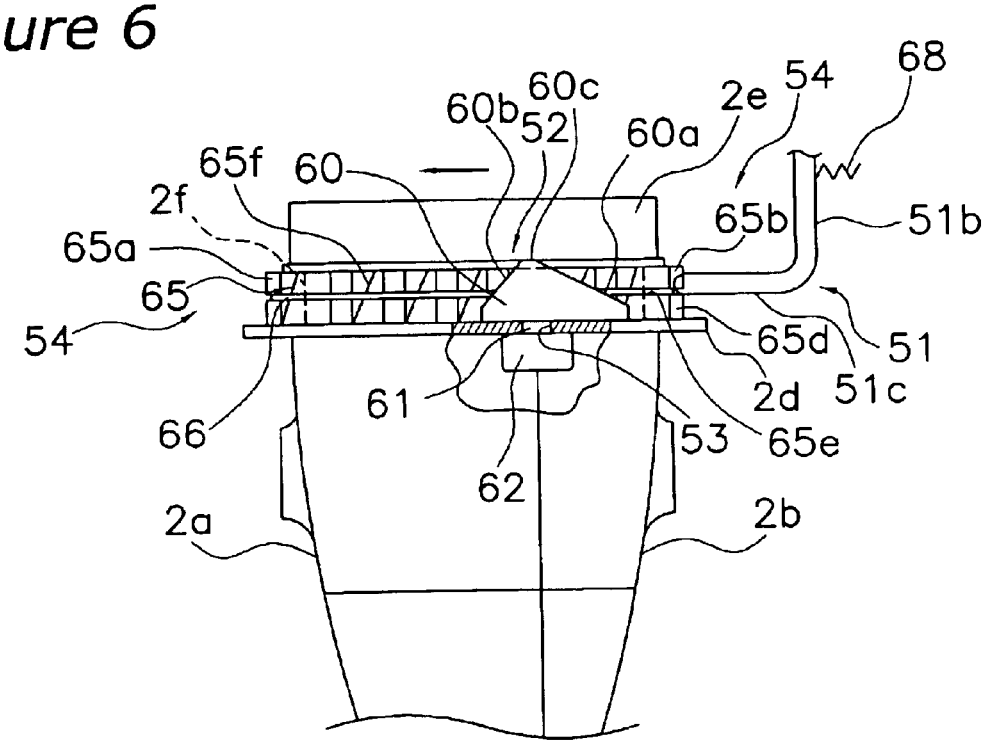
FIG. 6 is a partial bottom plan view of the reel body illustrating the bail tripping mechanism in accordance with the preferred embodiment of the present invention.

Referring to FIGS. 1 and 2, the lid member 2b is made, for example, of an aluminum alloy, and for example, is screwed at three locations to the reel body 2a. As shown in FIGS. 5 and 6, a switching member 52 (described below) is detachably mounted to the flange portion 2d at a position between the point at which the reel body 2a and the lid member 2b can be separated from each other.

As shown in FIG. 2, the rotor driving mechanism 5 includes a handle shaft 10 on which the handle 1 is mounted non-rotatively, a face gear 11 that rotates together with the handle shaft 10, and a pinion gear 12 that meshes with the face gear 11. The pinion gear 12 is tubular, and a front portion 12a thereof penetrates the center of the rotor 3 and is fixed by a nut 13 to the rotor 3. A central portion and a rear end portion of the pinion gear 12 in the axial direction are supported on the reel unit 2 via bearings 14a and 14b so that the pinion gear 12 is freely rotatable thereon.

The oscillating mechanism 6 moves back and forth a spool shaft 15 that is coupled via a drag mechanism 71 to the center of the spool 4, which in turn moves the spool 4 in the same direction.

As shown in FIG. 2, the rotor 3 includes a rotor unit 16, a bail arm 17, and a bail tripping mechanism 18. The bail arm 17 is mounted on the front of the rotor unit 16 and pivotable between a line-releasing position and a line-winding position. The bail tripping mechanism 18 is mounted to the rotor unit 16 and serves to return the bail arm 17 from the line-releasing position to the line-winding position.

The rotor unit 16 includes a cylindrical portion 30, a first rotor arm 31, and a second rotor arm 32. The cylindrical portion 30 is mounted to the reel body 2a and can rotate freely around the spool shaft 15. The first rotor arm 31 and the second rotor arm 32 are arranged opposite one another on the sides of the cylindrical portion 30. The cylindrical portion 30 and the two rotor arms 31 and 32 can be made of, for example, an aluminum alloy, and are formed to be integral with each other.

A front wall 33 is formed at the front of the cylindrical portion 30, and a boss portion 33a is formed in the center of the front wall 33. A through hole is formed in the center of the boss portion 33a, and the front end 12a of the pinion gear and the spool shaft 15 are passed through this through hole. A nut 13 is provided for fixing the rotor 3 to the front of the front wall 33. A rear surface of the cylindrical portion 30 is covered by a third cover member 30a.

Figure 3:
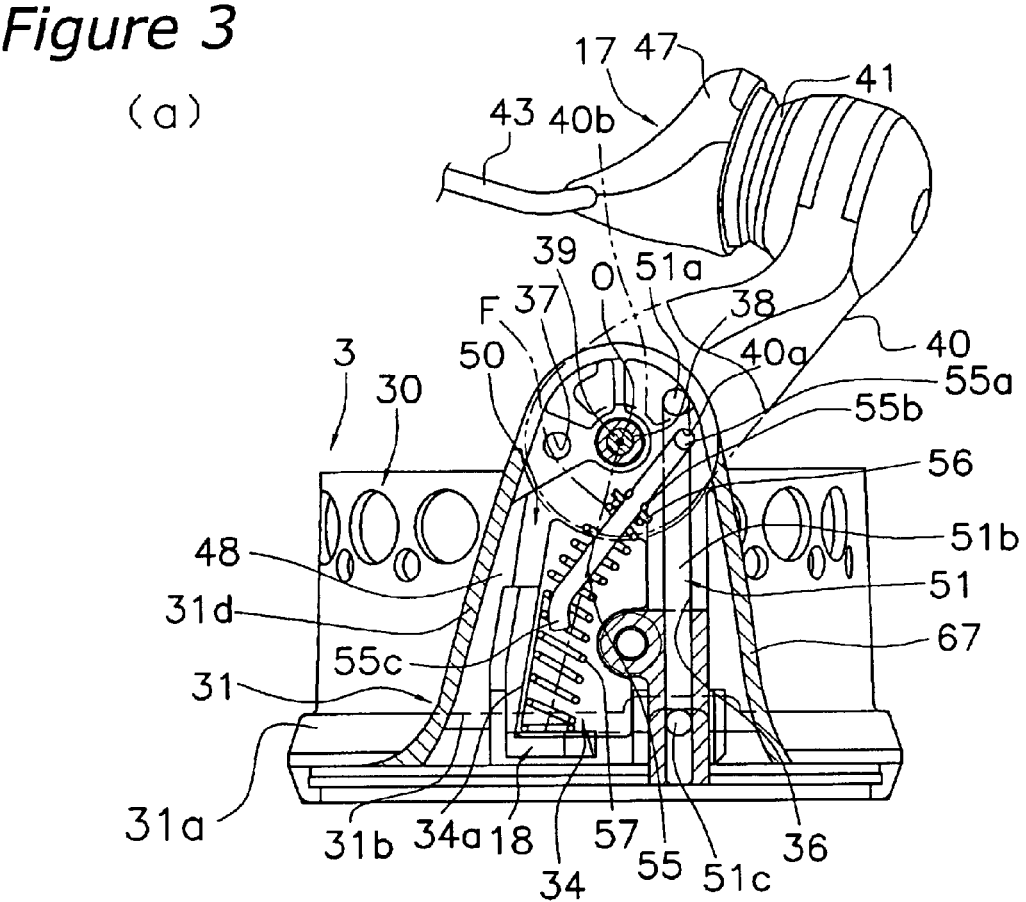
FIGS. 3a and 3b are plan views of a first rotor arm of the spinning reel in accordance with the preferred embodiment of the present invention, with sections cut away for illustrative purposes.
Figure 3:
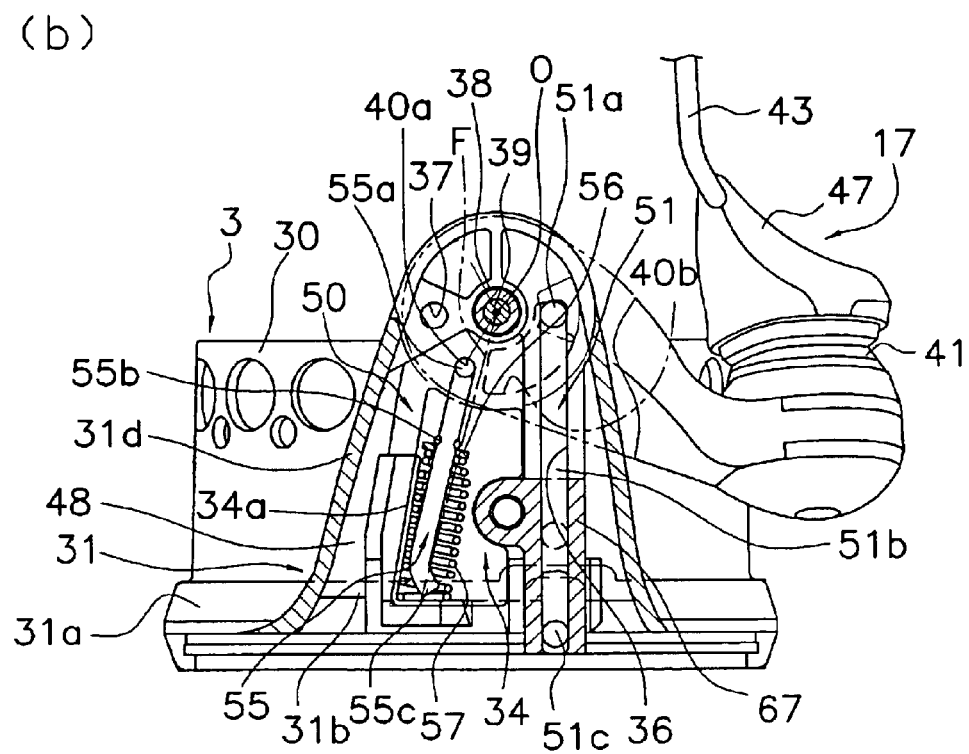
Figure 4:
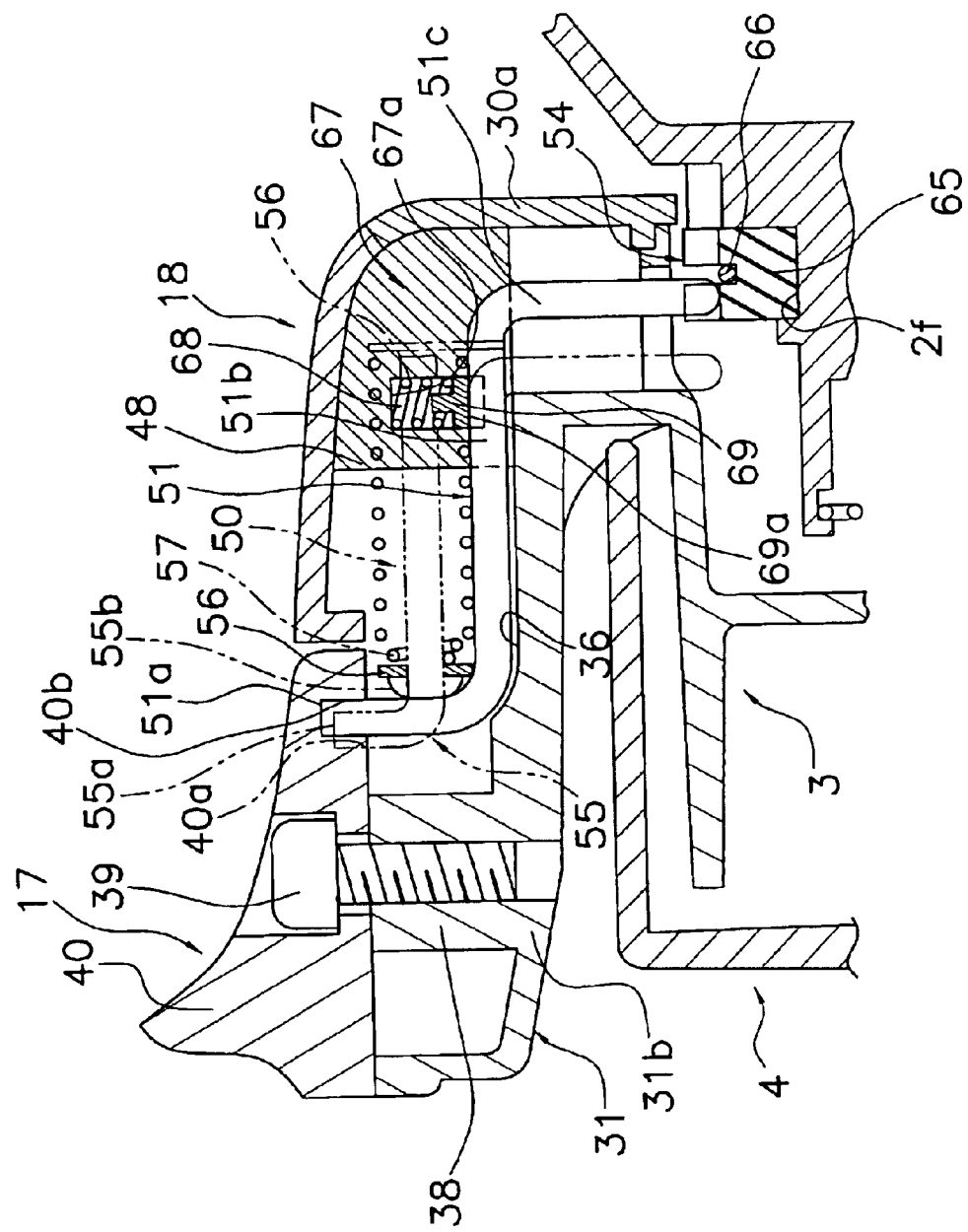
FIG. 4 is an enlarged cross-sectional view of the first rotor arm in accordance with the preferred embodiment of the present invention.

As shown in FIGS. 2 to 4, the first and second rotor arms 31 and 32 respectively include first and second connection portions 31a and 32a, first and second arm portions 31b and 32b, and first and second cover members 31c and 32c. The first and second connection portions 31a and 32a are arranged at a peripheral surface on the rear of the cylindrical portion 30. The first and second arm portions 31b and 32b curve outward and extend forward from the first and second connection portions 31a and 32a. The first and second cover members 31c and 32c cover the outer portions of both the two connection portions 31a and 32a and the two arm portions 31b and 32b. The first and second connection portions 31a and 32a are formed in smooth circumferential continuation of the cylindrical portion 31.

The first and second arm portions 31b and 32b are formed in smooth continuation of the first and second connection portions 31a and 32a, and extend forward while maintaining a gap between themselves and the cylindrical portion 30. The first and second arm portions 31b and 32b form a smooth curve from their tips to the portion where they are connected to the cylindrical portion 30. Apertures 31d and 32d are formed in outer portions of both of the two connection portions 31a and 31b and the two arm portions 31b and 32b. Further, the first and second cover members 31c and 32c cover the apertures 31d and 32d from an outer circumferential side thereof. An accommodation space 48 is formed between the first cover member 31c, the first connection portion 31a, and the first arm portion 31b.

A first bail support member 40 is mounted pivotably to an outer circumferential side of the first rotor arm 31b. As shown in FIGS. 3 and 4, a long and narrow guide groove 36, a mounting hole 37, and a boss 38 are formed on the first arm portion 31b. The long and narrow guide groove 36 guides a moving member 51 (described below) of the bail tripping mechanism 18. The mounting hole 37 has a restriction mechanism 75 (see FIG. 8) that is mounted therein that serves to confer resistance to the bail arm 17. The boss 38 has a screw hole therein that serves to mount pivotably the first bail support member 40. A second bail support member 42 is pivotably mounted to the inner circumferential tip of the second rotor arm 32b.

The first bail support member 40 is attached to the first rotor arm 31 by way of a threaded attachment pin 39 at the boss 38 of the first arm 31b. The attachment pin 39 is made of a bolt with a hexagonal hole that makes it difficult for fishing line to get caught at its screw head.

As shown in FIGS. 3a and 3b, a line roller 41 and a fixed shaft cover 47 are mounted to the front tip of the first bail support member 40. The line roller 41 guides fishing line to the spool 4. The fixed shaft cover 47 is fixed to the first bail support member 40 and has the line roller 41 interposed therebetween. The line roller 41 is rotatively mounted to the front tip of the first bail support member 40. The fixed shaft cover 47 is shaped like a deformed cone having a sharpened tip. A bail 43 formed by bending a wire into an approximate U-shape is fixed between the tip of the fixed shaft cover 47 and the second bail support member 42. The first and second bail support members 40 and 42, the line roller 41, the bail 43, and the fixed shaft cover 47 constitute the bail arm 17, which guides the fishing line to the spool 4. The bail arm 17 can be pivoted between a line-winding position shown in FIG. 3(a), and a line-releasing position shown in FIG. 3(b) that is tripped over from the line-winding position.

The bail tripping mechanism 18 is disposed in the accommodation space 48 of the first rotor arm 31. The bail tripping mechanism 18 restores the bail arm 17 from the line-release position to the line-winding position when the rotor 3 is rotated, and maintains the bail arm 17 in these two positions.

As shown in FIGS. 3a to 6 and 8, the bail tripping mechanism 18 includes a toggle spring mechanism 50, a moving member 51, a switching mechanism 52, a rotor braking mechanism 54, and a restriction mechanism 75. The toggle spring mechanism 50 is mounted within the accommodation space 48 and is pivotably mounted to the first arm portion 31b. The moving member 51 is mounted in the accommodation space 48 such that it is moveable approximately back and forth. The switching member 52 is mounted detachably on the flange portion 2d such that it can contact the moving member 51. The rotor braking mechanism 54 has a braking member 65 to brake the rotor 3. The restriction mechanism 75 restricts the bail arm 17 from returning to the line-winding position when in the line-releasing position.

As shown in FIG. 3, the toggle spring mechanism 50 is disposed inside the first rotor arm 31, and can assume a first position in which the bail arm 17 is in the line-winding position, and a second position in which the bail arm 17 is in the line-releasing position. The toggle spring mechanism 50 serves as a mechanism for holding the bail arm 17 in the line-winding position or the line-releasing position. The toggle spring mechanism 50 includes a rod 55 and a coil spring 57. One end of the rod 55 is interlocked with the first bail support member 40, and the other end extends along the first arm portion 31b. The coil spring 57 urges the rod 55 outward.

As shown in FIG. 4, the rod 55 includes an interlocking portion 55a that is bent toward the first bail support member 40 such that its front end is interlocked with the engagement hole 40a of the first bail support member 40. The rod 55 also includes an interlocking protrusion 55b at an intermediate position thereon for interlocking with the front end of the coil spring 57, as well as a bent portion 55c at its rear end that is bent slightly. A washer 56 abutting against the front end of the coil spring 57 is mounted on the interlocking protrusion 81b, so that forces are transmitted evenly from the front end portion of the coil spring 57 to the rod 55.

The coil spring 57 is guided by contacting a guiding sheet 34 preferably made of a synthetic resin such as a polyamide resin that is disposed in the arm portion 31b. The guiding sheet 34 includes a wall portion 34a that is bent such that it guides and interlocks with one side surface of the coil spring 57. The wall portion 34a has a height that allows it to contact the lateral portion and the base end of the coil spring 57. Thus, the coil spring 57 can be compressed easily, and the arm portion 31b is not damaged when the coil spring 57 is compressed.

The front end of the coil spring 57 interlocked with the washer 56 has a smaller winding diameter than the rest of the coil spring 82. Thus, except for the front end, a relatively large gap is created between the coil spring 57 and the rod 55. Therefore, the coil spring 57 is not easily deformed when the rod 55 changes its position inside the coil spring 57. Note that it is also possible to provide a boss portion that contacts the inner peripheral surface of the base portion of the coil spring 57, or a cover portion that covers the outer peripheral surface of the base portion, such that the base portion of the coil spring 57 is engaged. Furthermore, it is also possible to mount the boss portion and the cover portion on the first arm portion 31b such that they pivot around an axis that is parallel to the pivot axis of the first bail support member 40. For example, it is possible to form an arc-shaped projection on the base surface of the boss portion and an arc-shaped recess that engages with this arc-shaped projection on the first arm portion 31b, so as to make the boss portion pivotable.

This toggle spring mechanism 50 is arranged such that the positions at which the rod 55 is engaged with the first bail support member 40 in the line-winding position and the line-releasing position are different with respect to the lines connecting the coil spring 57 (which is the axis of the pivot shaft), the central position of the base end, and the pivot axis O of the first bail support member 40 (the axis of the attachment pin 39). The position at which these lines intersect is the dead point of the toggle spring mechanism 50 (the position at which the coil spring 57 is most compressed). Thus, the toggle spring mechanism 50 can toggle the bail arm 17 between two positions interposed by a dead point, can bias the bail arm 17 toward both positions, and can maintain the bail arm 17 in both positions. The dead point of the toggle spring mechanism 50 is shifted toward the line-releasing position.

The moving member 51 is, for example, a wire made of a metal such as stainless steel, and its two ends are bent to 90 degree angles and point in different directions. The moving member 51 is mounted on the first arm portion 31b such that it can be moved approximately back and forth between a first position (withdrawn position) shown in FIG. 3(a) and a second position (contact position) shown in FIG. 3(b). As shown in FIGS. 3 to 6, the front end portion 51a of the moving member 51 is bent outward and engaged with a fan shaped engagement groove 40b formed in the first bail support member 40. A middle portion 51b extends along the first arm portion 31b, inward in the radial direction with respect to the rod 55.

A rear end portion 51c (an example of projecting part) passes through the guide groove 36, and projects inward to a position where it overlaps slightly with the braking member 65 that forms a part of the rotor braking mechanism 54. The width of the guide groove 36 is roughly the same as the diameter of the moving member 51. Therefore, the inner side in the radial direction of the central portion 51b of the moving member 51 is guided back and forth along the guide groove 36 as the bail arm 17 pivots. The outer peripheral sides of the middle portion 51b and the curved portion of the rear end portion 51c are guided back and forth and in the radial direction by a guide member 67. The guide member 67 is fixedly coupled to the first cover member 31c, and a concave groove 67a that is curved so that the rear end portion 51c is accommodated therein is formed in the interior of the guide member 67.

A mounting hole 67b is formed in the guide member 67. The mounting hole 67b has, for example, a cylindrical shape and that is capable of mounting a push spring 68 made of a coil spring. The push spring 68 is mounted in the concave groove 67a in the compressed state, and urges the rear end portion 51c toward the braking member 65 by pressing down on the middle portion 51b of the moving member 51. A push member 69 is mounted on the tip of the push spring 68 so that it engages with the outer peripheral surface of the middle portion 51b of the moving member 51. A semi-circular arc-shaped concave portion 69a is formed on the push member 69. The push member 69 makes the middle portion 51b of the moving member 51 move back and forth, and is provided in order to transmit the urging force of the push spring 68 to the middle portion 51b efficiently.

When the bail arm 17 is in the line-releasing position, the end of the moving member 51 that is interlocked with the engagement groove 40b is positioned further toward the line-winding position than a line connecting the rear end portion 51c with the pivot center O of the bail arm 17. That is to say, the moving member 51 is positioned so that in both the first position (withdrawn position) and the second position (contact position), the location where it is interlocked with the first bail support member 40 is on the same side with respect to the line connecting the axis O of the rear end portion 51c in the contact position (see FIG. 3b) with the pivot axis of the first bail support member 40. Thus, when the switching member 52 presses against the rear end portion 51c of the shifting member 51, the first bail support member 40 can be restored to the line-winding position. In this second position (contact position), the end surface of the rear end portion 51c is located slightly inward from the outer peripheral surface of the braking member 65 at the front end surface of the braking member 65. Therefore, the same braking power can always be obtained even if the amount of movement of the moving member 51 varies slightly.

The switching member 52 is preferably made of a synthetic resin, such as a polyamide resin or polyacetal. As shown in FIGS. 5 and 6, the switching member 52 is detachably mounted on the flange 2d at a portion which separates the reel body 2a from the lid member 2b. A rectangular cut-out 53 is formed at the portion which separates the reel body 2a from the lid member 2b. The switching member 52 includes a cone-shaped cam portion 60 having two oblique surfaces 60a and 60b, a neck portion 61 integrally formed with the cam portion 60, and a brim portion 62. The downstream side in the line-winding direction (shown by the arrow in FIG. 6) of the oblique surface 60a projects forward toward the rotor 3 more than the upstream side thereof does. The amount that the oblique surface 60b projects toward the downstream side in the line-winding direction is less than that of the oblique surface 60a. A projecting tip 60c is the highest forward projecting point of the oblique surfaces 60a and 60b, and the amount that it projects forward is set such that it exceeds the dead point of the toggle spring mechanism 50 when the rear end portion 51c of the moving member 51 contacts the oblique surface 60a and pushes the bail arm 17 toward the line-winding position.

The neck portion 61 is sized such that it can be fitted into the cut-out 53, and the gap between the cam portion 60 and the brim portion 62 is approximately the same as the wall thickness of the flange portion 2d. The brim portion 62 has a cross-section that is larger than the neck portion 61, and contacts the back of the flange portion 2d. When the oblique surface 60b is provided and the bail arm 17 is in the line-releasing position, even if the rotor 3 is forced to rotate in reverse (rotation in the direction in which the line is reeled out) and the moving member 51 contacts the switching member 52, the moving member 51 of the bail tripping mechanism 18 is guided smoothly by the oblique surface 60b of the switching member 52.

The rotor braking mechanism 54 brakes the rotor 3 when the bail arm 17 has pivoted into the line-releasing position. The rotor braking mechanism 54 includes the moving member 51 and the braking member 65 mounted on the mounting groove 2f formed on the base end of the cylindrical portion 2e. In other words, the moving member 51 is not only part of the bail tripping mechanism 18, but also part of the rotor braking mechanism 54.

The braking member 65 is provided in order to brake the rotation of the rotor 3 when the bail arm 17 is in the line-releasing position. The braking member 65 is made of two members, which are an approximately semi-circular first braking member 65a and a second braking member 65b (constituent members of the braking member 65). The first and second braking members 65a and 65b are made of an elastic material such as a synthetic rubber such as styrene-butadiene rubber (SBR), acrylonitrile-butadiene rubber, butadiene rubber, isoprene rubber, chloroprene rubber, silicone rubber, or urethane rubber. The first braking member 65a and the second braking member 65b are press-fitted into the circular mounting groove 2f by a spring member 66 mounted on a groove 65e formed in the outer periphery of the first and second braking members 65a and 65b. The braking member 65 includes a drag portion 65c and a plurality of engaging portions 65d. The drag portion 65c frictionally engages with the mounting groove 2f and allows rotation. The plurality of engaging portions 65d engages with the rear end portion 51c of the moving member 51. The engaging portions 65d are gaps disposed on the outer periphery of the braking member 65, and are engaging grooves that engage with the rear end portion 51c. In addition, tapered portions 65f that incline toward the engaging portions 65d are formed at a plurality of locations on the braking member 65. The tapered portions 65f are oblique surfaces that are formed to guide the rear end portion 51c to the engaging portions 65d.

The spring member 66 is a wire-shaped member that is mounted in the groove 65e formed in the outer periphery of the braking member 65. Note that although not shown in the figures, a notch is formed in a portion of the spring member 66 in order to mount it to the braking member 65.

Figure 7:
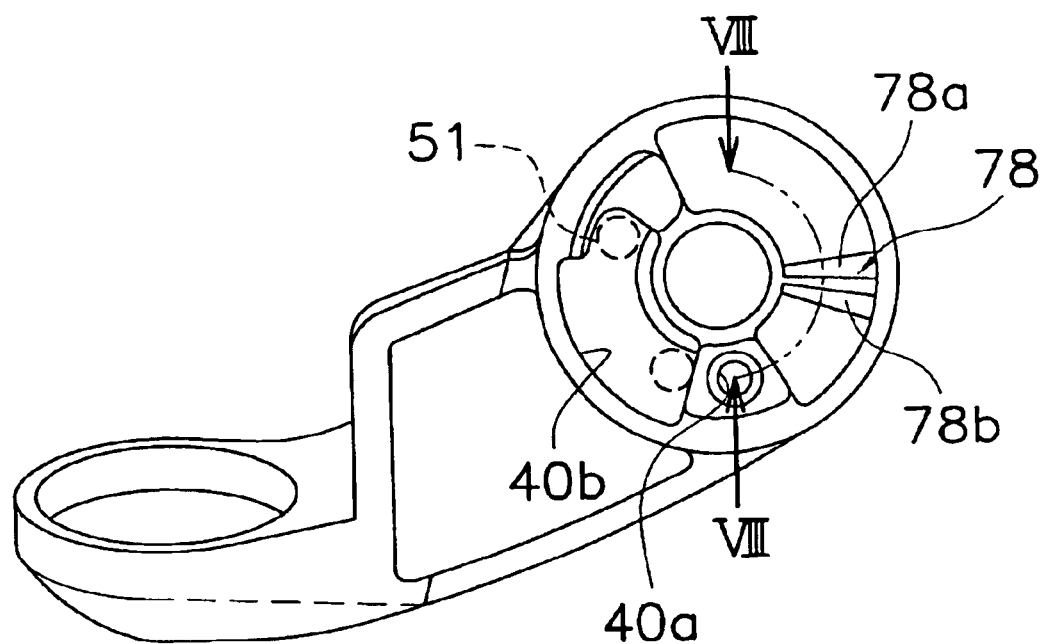
FIG. 7 is a sectional view of the first bail support member in accordance with the preferred embodiment of the present invention.
Figure 8:
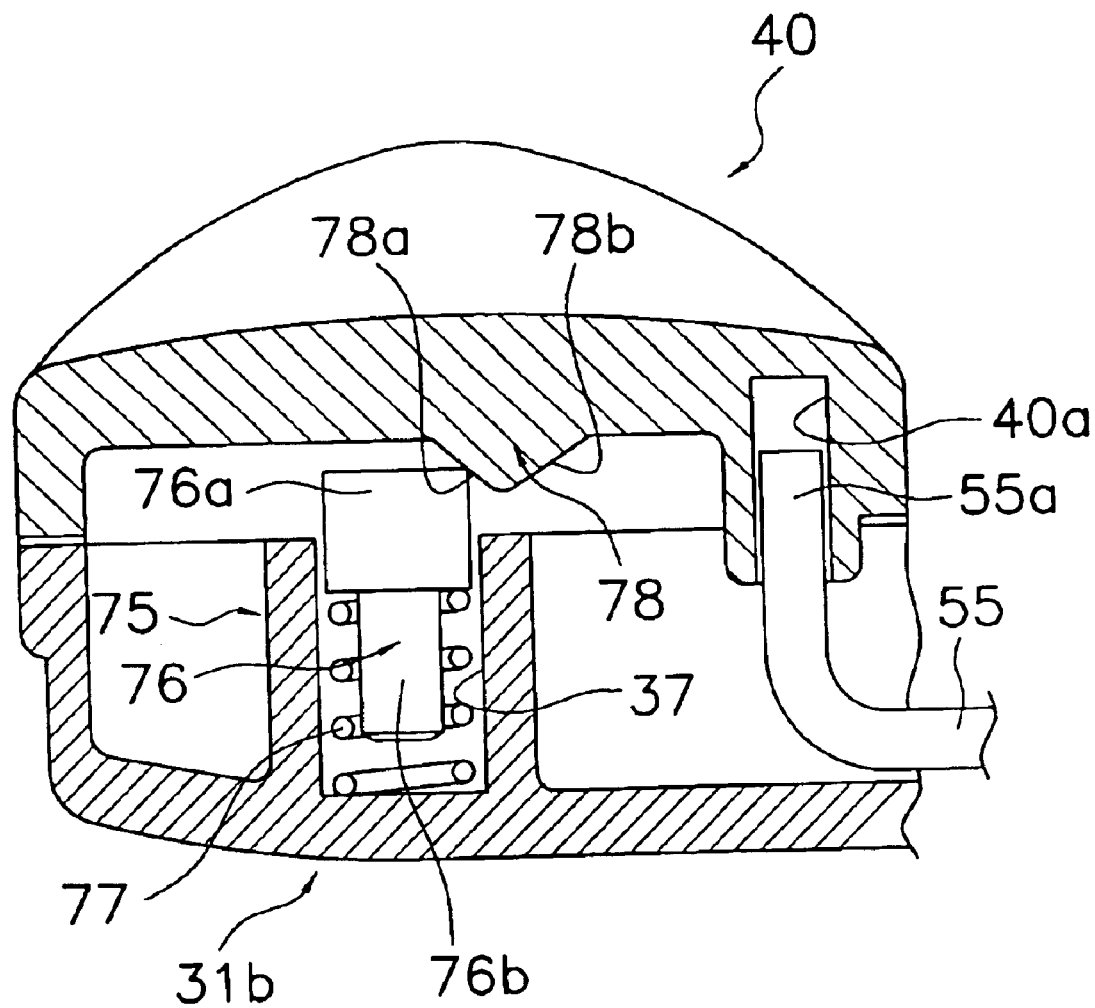
FIG. 8 is a cross-sectional view of the first bail support member in accordance with the preferred embodiment of the present invention as viewed along the line VIII—VIII in FIG. 7.

As seen in FIG. 8, the restriction mechanism 75 is provided between the opposing portions of the bail arm 17 and the first arm portion 31b of the rotor 3. This mechanism restricts the bail arm 17 from returning to the line-winding position when the bail arm 17 is disposed in the line-releasing position, and releases this restriction when the rear end portion 51c of the moving member 51 reaches the projecting tip 60c of the oblique surface 60a and pivots the bail arm 17 to the line-winding position. As shown in FIGS. 7 and 8, the restriction mechanism 75 includes a restriction pin 76 that is mounted in the mounting hole 37 of the first arm portion 31b, a coil spring 77 that urges the restriction pin 76 toward the bail arm 17, and a pushing portion 78 that is provided on the first bail support member 40.

Figure 9:
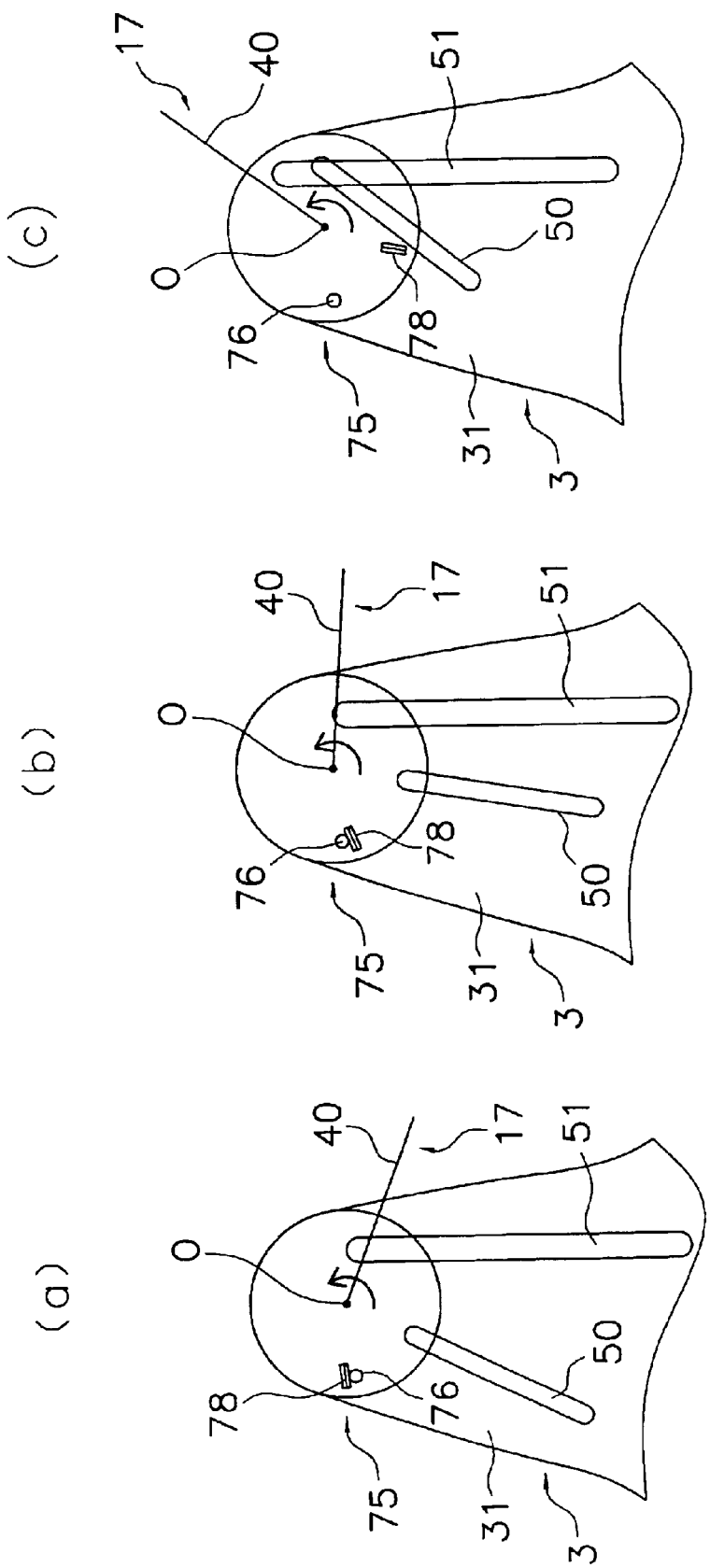
FIGS. 9a–9c are schematic views of the rotor braking mechanism in accordance with the present invention, showing the changes in the restriction state as the bail arm is pivoted.

The restriction pin 76 is preferably a metal pin having a large diameter contact portion 76a and a small diameter spring mounting portion 76b. A tip of the coil spring 77 contacts with the stepped portion between the contact portion 76a and the spring mounting portion 76b. The coil spring 77 is disposed around the outer periphery of the spring mounting portion 76b, and urges the restriction pin 76 toward the first bail support member 40. The pushing portion 78 has two oblique surfaces 78a and 78b, and is formed to project toward the first arm portion 31. When the first arm portion 31b is to be pivoted from the line-releasing position to the line-winding position, the pushing portion 78 is disposed in a position in which it can pass over the restriction pin 76 and release the restriction at the point at which the rear end portion 51c of the moving member 51 reaches the projecting tip 60c of the oblique surface 60a. More specifically, as shown in FIG. 9a, the pushing portion 78 is positioned upstream from the restriction pin 76 (the pivot direction shown by the arrow) when in the line-releasing position, and as shown in FIG. 9b, passes over the restriction pin 76 at the point in which the toggle spring mechanism 50 reaches the dead point when pivoting to the line-winding position.

Referring to FIGS. 3a and 3b, in the bail tripping device 18 configured in this manner, the toggle spring mechanism 50 can be toggled between a first position shown in FIG. 3a and a second position shown in FIG. 3b. The first position corresponds to the line-winding position of the bail arm 17, and the second position corresponds to the line-releasing position of the bail arm 17. Furthermore, the rear end portion 51c of the moving member 51 is guided by the guide groove 36 and moved back and forth between the first position (withdrawn position) shown in FIG. 3a and the second position (contact position) shown in FIG. 3b. The first position (withdrawn position) corresponds to the line-winding position, whereas the second position (contact position) corresponds to the line-releasing position. In the second position (contact position), the rear end portion 51c of the moving member 51 engages with an engagement portion 65d of the braking member 65. At this time, in the rotor braking device 54, when the rotor 3 and the braking member 65 rotate, the rotor 3 is braked because the drag portion 65c frictionally engages with the mounting groove 2f.

In addition, in the second position (contact position), when the rotor 3 is rotated with the handle 1 in the line-winding direction, the rear end portion 51c of the moving member 51 strikes the oblique surface 60a of the switching member 52 and rotates. Further, the moving member 51 is pushed forward toward the first position (withdrawn position), and the bail arm 17 returns to the line-winding position at the point the toggle spring mechanism 50 exceeds the dead point. At this time, the restriction due to the restriction pin 76 of the restriction mechanism 75 is released at the point that the dead point of the toggle spring mechanism 50 is exceeded.

As shown in FIG. 2, a reverse rotation check mechanism 70 for blocking and releasing the reverse rotation of the rotor 3 is disposed inside the cylindrical portion 30 of the rotor 3. The reverse rotation check mechanism 70 has a roller-type one-way clutch and blocks or releases the reverse rotation of rotor 3 by switching the one-way clutch between an operating state and a non-operating state.

The spool 4 is disposed between the first rotor arm 31 and the second rotor arm 32 of the rotor 3. The spool 4 is mounted at the front end of the spool shaft 15 via the drag mechanism 71. The spool 4 includes a bobbin trunk portion 4a to wind fishing line around its circumference, a skirt portion 4b formed integrally with the rear of the bobbin trunk portion 4a, and a front flange portion 4c formed integrally with the front end of the bobbin trunk portion 4a.

Next, the handling and operation of the reel will be described.

When casting, the reverse rotation check mechanism 70 blocks reverse rotation of the rotor 3, and the bail arm 17 is grasped by hand and tripped into the line-releasing position. Tripping the bail arm 17 into the line-releasing position causes the first bail support member 40 and the second bail support member 42 to flip over backwards, so that the bail tripping mechanism 18 assumes the second position shown in FIG. 3(b). Then, in the restriction mechanism 75, the pushing portion 78 passes over the restriction pin 76 when the dead point of the toggle spring mechanism 50 is exceeded. When the bail arm 17 has flipped into the line-releasing position, fishing line can be easily rolled off the spool 4.

When pivoting from this line-winding position to the line-releasing position, the rotation of the first bail support member 40 causes the rod 55 in the toggle spring mechanism 50 to pivot in a counter-clockwise direction in FIG. 3a while retreating gradually, thereby assuming the second position shown in FIG. 3b. In this situation, the rod 55 retreats until it crosses the dead point. When it crosses the dead point, the spring force of the coil spring 57 pushes the rod 55 out, whereby the bail arm 17 switches to the line-releasing position and is held there by the force of the spring. When the dead point is crossed, the pushing portion 78 of the restriction mechanism 75 crosses over the restriction pin 76 and restricts the bail arm 17 from pivoting to the line-winding position. At the point at which the pushing member 78 has passed over the restriction pin 76, the restriction pin 76 will rapidly strike the first bail support member 40 and generate a sound.

When the bail arm 17 pivots to the line-releasing position, the rear end portion 51c of the moving member 51 engages with an engaging portion 65d of the braking member 65 as the bail arm 17 is being pivoted. Then, when the rotor 3 and the braking member 65 rotate, the rotor 3 is braked because the drag portion 65c frictionally engages with the mounting groove 2f.

In this state, the fishing rod is cast while grasping the fishing line with the index finger of the hand with which the fishing rod is held. When this occurs, the fishing line is released with a high degree of momentum due to the weight of the tackle. As noted above, the bail arm 17 is restricted by the restriction mechanism 75, thus making it difficult for it to turn from the line-releasing position to the line-winding position.

After casting, when the handle 1 is rotated in the line-winding direction while the bail arm 17 is still in the line-releasing position, the rotor drive mechanism 5 rotates the rotor 3 in the line-winding direction. When the rotor 3 rotates in the line-winding direction, the bail tripping mechanism 18 restores the bail arm 17 to the line-winding position.

With this type of rotor braking device 54, when the bail arm 17 pivots from the line-winding position to the line-releasing position, the rear end portion 51c of the moving member 51 provided on the rotor 3 engages with an engaging portion 65d of the braking member 65, and when the rotor 3 and the braking member 65 rotate, the rotor 3 is braked because the drag 65c is frictionally engaged with the mounting groove 2f. Here, the braking of only a portion of the rotor 3 will not occur as in the prior art because the drag portion 65c is rotatably and frictionally engaged with the mounting groove 2f, and the braking force can be stabilized because the rotor 3 is braked uniformly.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

(a) In the aforementioned embodiment, a front drag type of spinning reel was used as an example. However, the present invention can be adopted in the bail tripping device of all types of spinning reels that return a pivotable bail arm to the line-winding position, such as a rear drag type spinning reel or a lever brake type spinning reel.

(b) In the aforementioned embodiment, the braking member 65 includes two members, the first braking member 65a and the second braking member 65b. However, the braking member 65 may, for example, include one member or a plurality of constituent members. For example, a thin metal plate spring may be press-formed to form the braking member 65 from one member.

Figure 10:
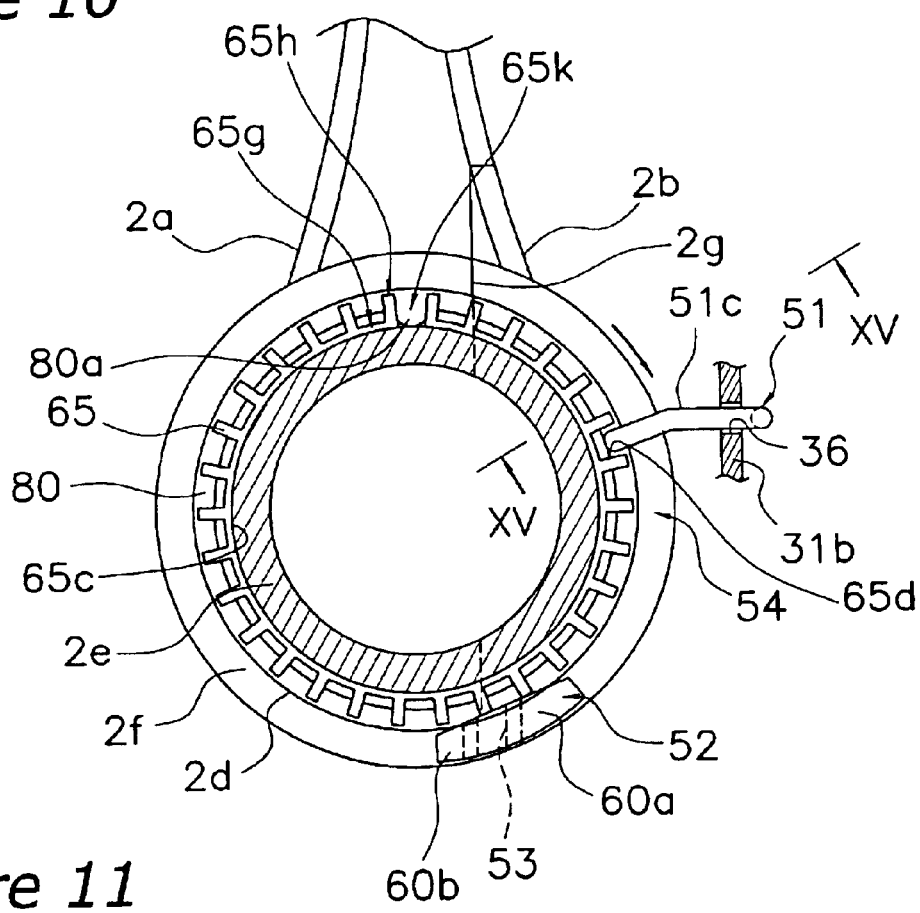
FIG. 10 is a cross-sectional front elevational view of a reel body illustrating the bail tripping mechanism in accordance with a second embodiment of the present invention.

(c) In the aforementioned embodiment, the braking member 65 is press fitted to the mounting groove 2f by means of the spring member 66. However, the present invention is not limited thereto. For example, as shown in FIG. 10, the elastic force of the braking member 65 itself may be used to press fit it to the mounting groove 2f.

As shown in FIGS. 10 to 15, the braking member 65 includes an annular plate spring 65g on which the drag portion 65c is formed on the inner periphery thereof. Further, the braking member 65 includes a plurality of projections 65h provided on the outer periphery of the plate spring 65g that radiate outward in the radial direction.

Figure 12:
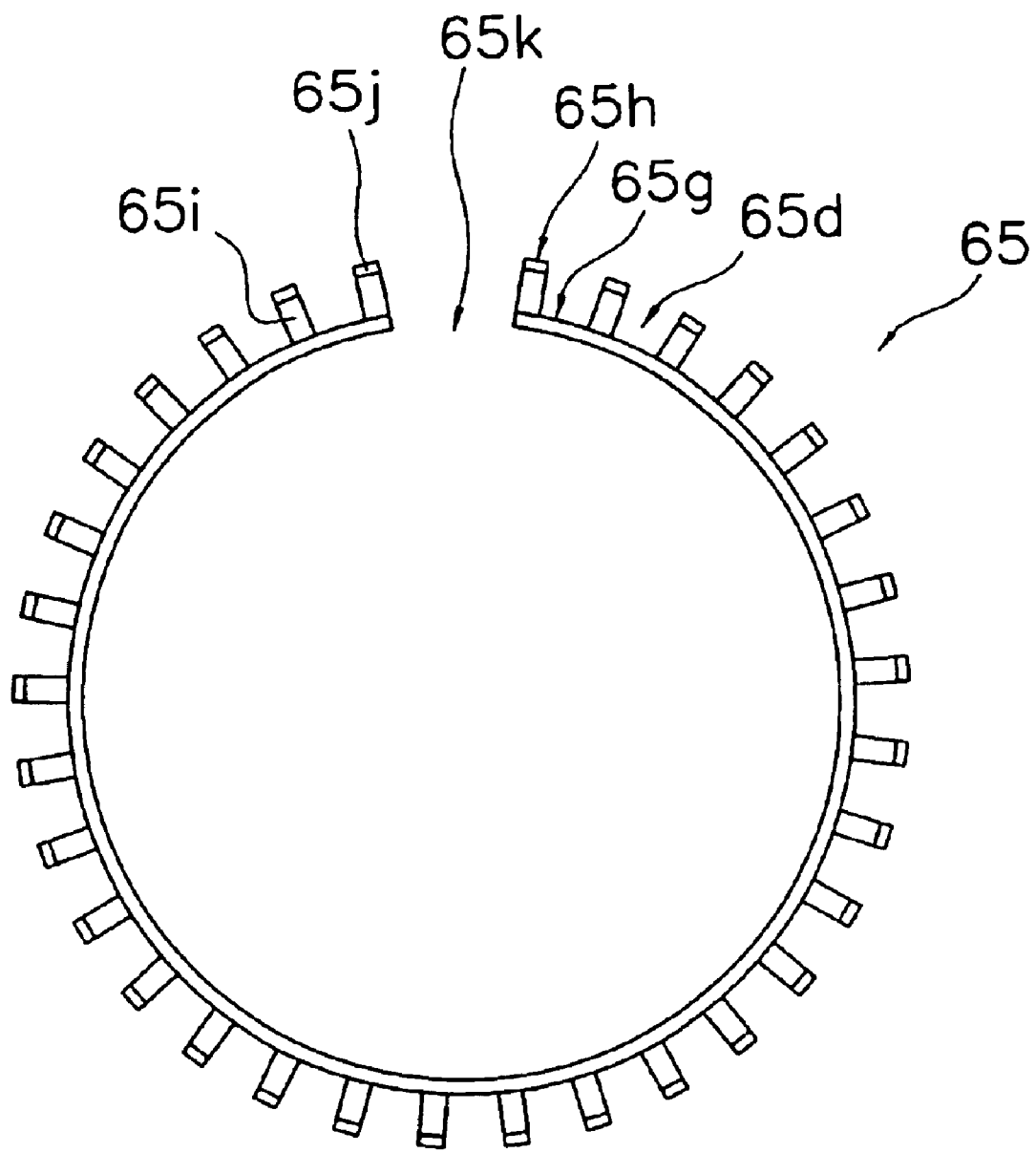
FIG. 12 is an enlarged elevational view of a braking member of the reel body taken from the reel body side in accordance with the second embodiment of the present invention.

As shown in FIG. 12, the plate spring 65g is preferably a thin metal member, and includes a cut-out portion 65k that is cut out therefrom in an approximate C-shape when the plate spring is formed into an annular shape. The projections 65h are spaced apart from each other on the outer periphery of the plate spring 65g, and the engagement portions 65d that engage with the rear end portion 51c of the moving member 51 are formed in the gaps in between the plurality of projections 65h.

Figure 14:
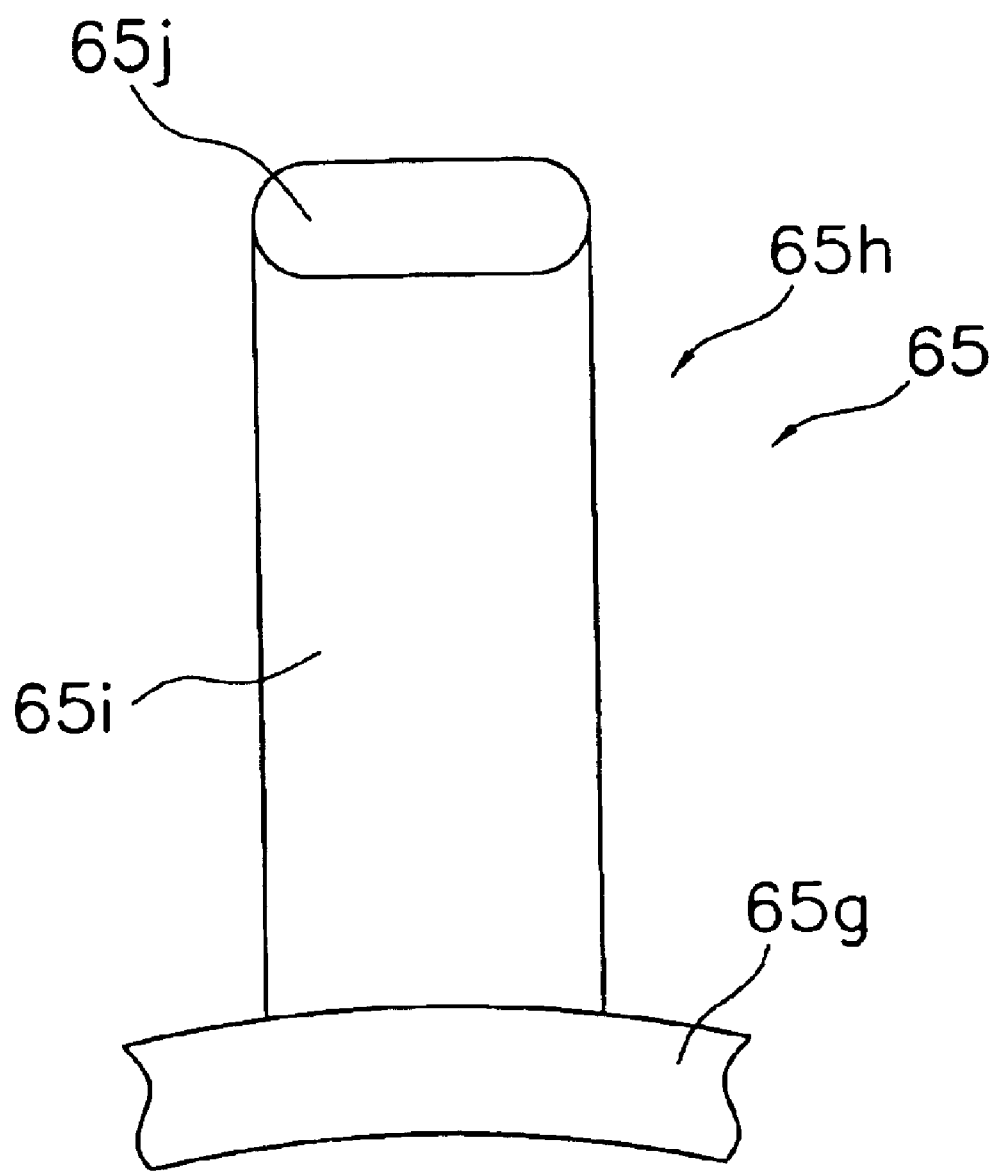
FIG. 14 is an enlarged elevational view of the braking member in accordance with the second embodiment of the present invention.
Figure 15:
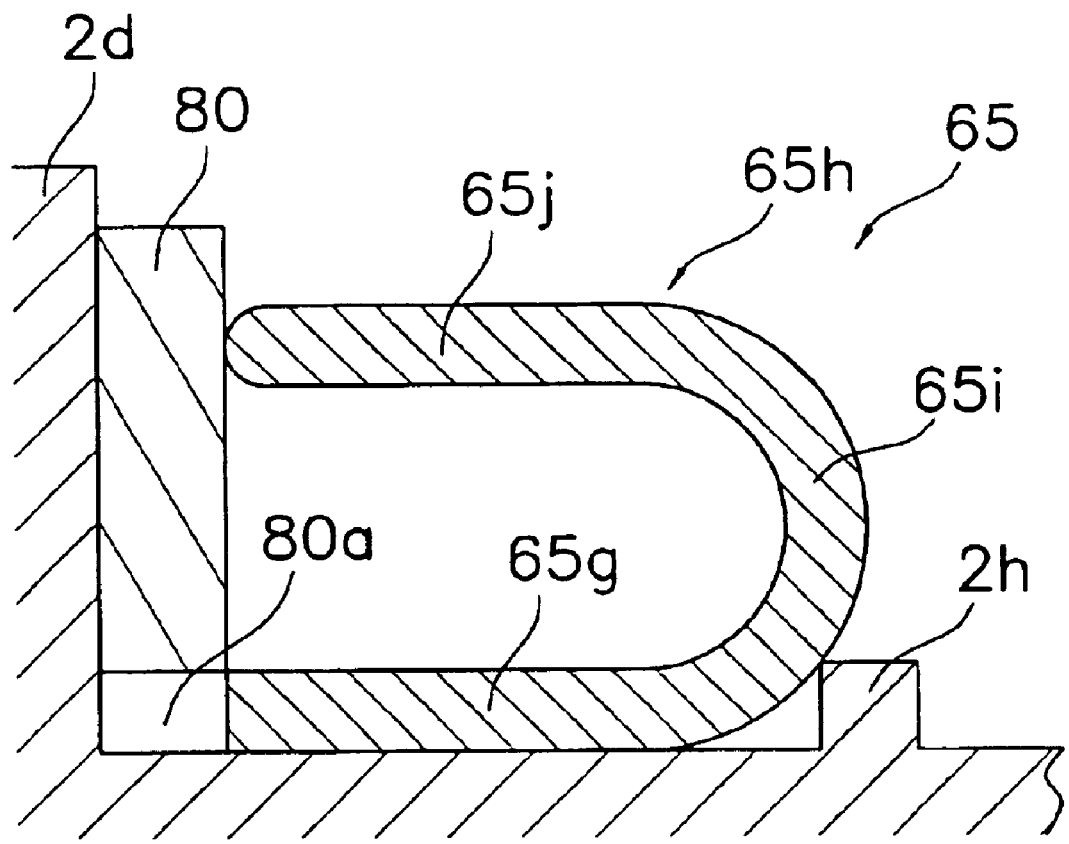
FIG. 15 is an enlarged cross-sectional elevational view of the area around the braking member in accordance with the second embodiment of the present invention.

As shown in FIGS. 14 and 15, the projections 65h include a first bent portion 65i in which the outer periphery of the plate spring 65g is bent outward in the radial direction, and a second bent portion 65j which is bent from the tip of the first bent portion 65i and extends along the rotational shaft X of the rotor 3, and the plate spring 65g in this embodiment. When the first bent portions 65i are formed on the braking member 65, the tips thereof bend toward the flange portion 2d. The first bent portions 65i and the second bent portions 65j are formed by press forming. In addition, as shown in FIG. 15, the braking member 65 is formed into an inverted C-shape when viewed in cross-section, and includes the plate spring 65g and the first and second bent portions 65i and 65j. Here, the overall number of parts can be reduced by forming the braking member 65 from one member.

Figure 11:
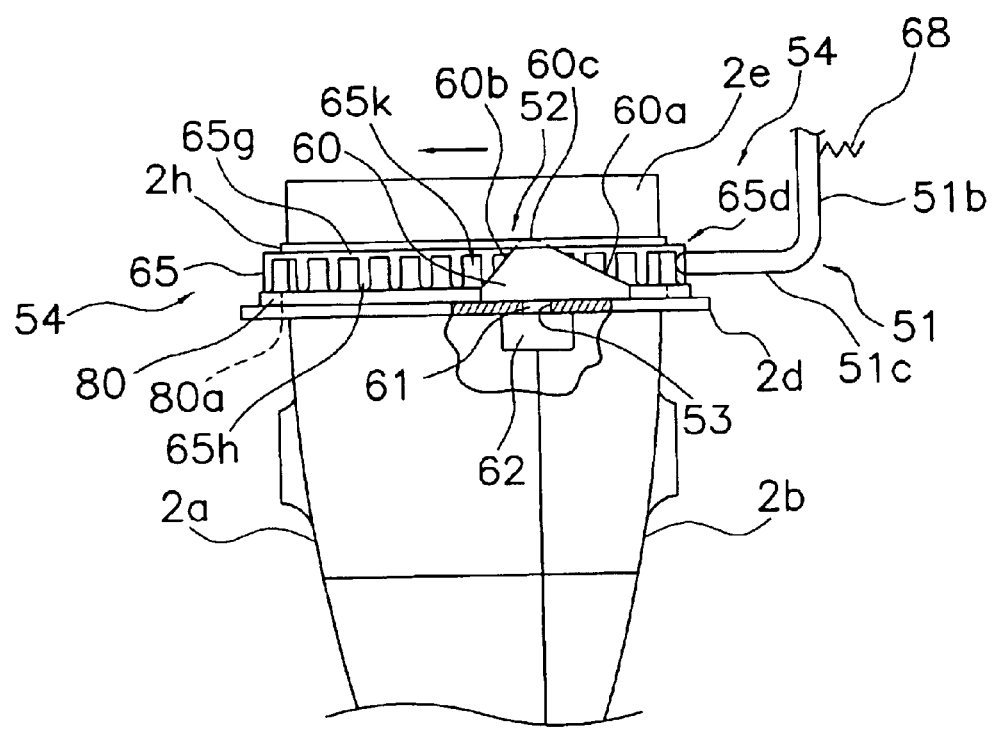
FIG. 11 is a partial bottom plan view of the reel body illustrating the bail tripping mechanism in accordance with the second embodiment of the present invention.
Figure 13:
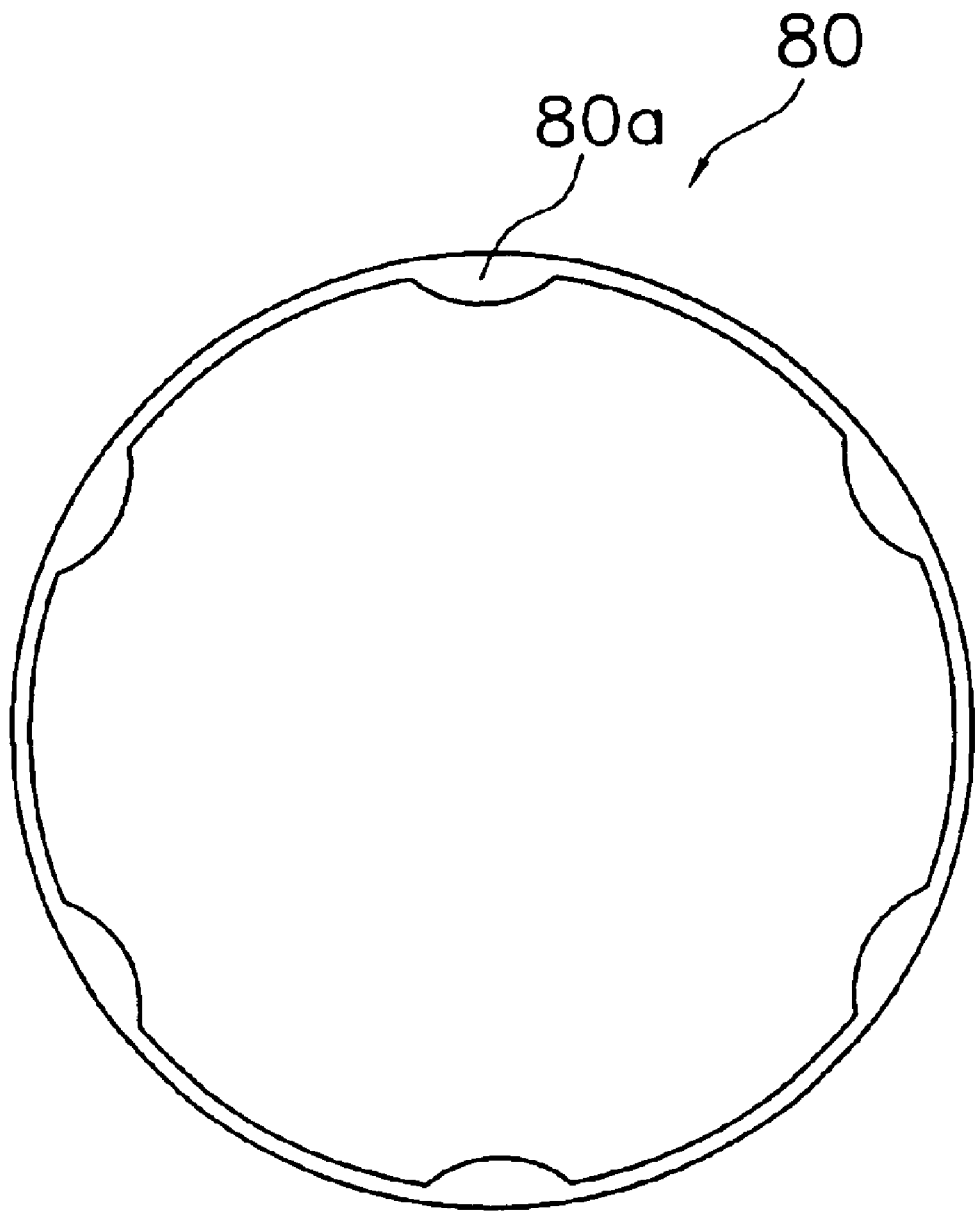
FIG. 13 is an enlarged elevational view of a metal ring member of the reel body in accordance with the second embodiment of the present invention.

In addition, as shown in FIGS. 10 and 11, an annular metal ring member 80 (an example of a washer member) is mounted in between the braking member 65 and the flange portion 2d. As shown in FIG. 13, the metal ring member 80 includes a plurality of tongue-shaped portions 80a that projects toward the inner periphery thereof. As shown in FIGS. 11 and 15, the inner diameter of the base portion of the tongue-shaped portion 80a is formed such that it is approximately the same as the outer diameter of a projection 2h that is formed on a mid-portion of the outer periphery of the flange portion 2d. Further, the inner diameter of the tip of the tongue-shaped portion 80a is formed such that it is smaller than the outer diameter of the projection 2h. Here, the metal ring member 80 is retained by the projection 2h by being pushed in such that the tongue-shaped portion 80a crosses over the projection 2h and the metal ring member 80 is mounted on the flange portion 2d. Furthermore, even if there is a portion 2g on the flange portion 2d in which the reel body 2a and the lid member 2b (see FIG. 10) are uneven, mounting the metal ring member 80 on the flange portion 2d can prevent the first bent portion 65i from getting caught on the uneven portion.

Figure 16:
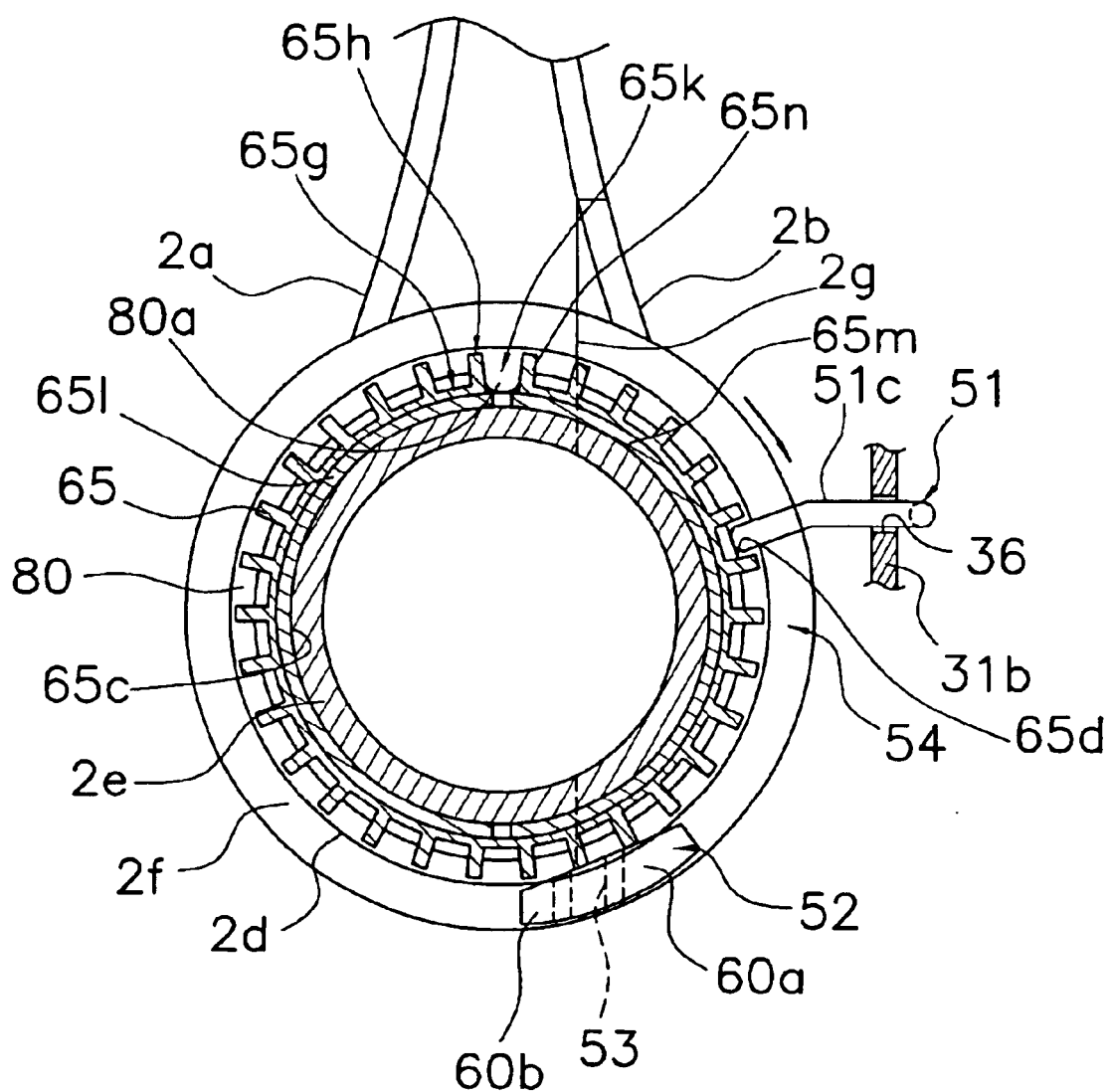
FIG. 16 is a cross-sectional front elevational view of a reel body illustrating a bail tripping mechanism in accordance with a third preferred embodiment of the present invention.

(d) As shown in FIG. 16, the braking member 65 may be constructed to include semi-hemispherically shaped first and second members 65l and 65m, each having the drag portion 65c on its inner peripheral portion, and an approximately C-shaped third member 65n that is provided as a separate member on the outer peripheral portion of the first and second members 65l and 65m and is press-fitted thereto by means of its elastic force. The first and second members 65l and 65m are, for example, made from an elastic material such as rubber, and are press fitted to the circular mounting groove 2f by means of the third member 65n. The third member 65n is a metal spring member, and includes an annular plate spring 65g to the inner periphery of which the first and second members 65l and 65m are mounted, and a plurality of projections 65h provided on the outer periphery of the plate spring 65g that radiate outward in the radial direction. The projections 65h are spaced apart from each other on the outer periphery of the plate spring 65g, and the engagement portions 65d that engage with the rear end portion 51c of the moving member 51 are formed in the gaps in between the plurality of projections 65h. Here, the braking member 65 is formed separately by a drag portion 65c of the first and second members 65l and 65m, and engagement portions 65d of the third member 65n, and thus the braking force of the braking member 65 can be precisely set and made stable.

According to the present invention, the projecting portion of the moving member in the rotor braking device of the spinning reel engages with engagement portions that are provided on the braking member, and the drag portion frictionally engages with the front portion of the reel unit and allows rotation. Due to this structure, the braking force can be stabilized because the moving member is uniformly braked over its entirety.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application Nos. JP2002-249255 and JP2003-084896. The entire disclosures of Japanese Patent Application Nos. JP2002-249255 and JP2003-084896 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for the purposes of illustration only, and not for the purpose of limiting the invention as defined by the appended claims and their equivalents.

What is claimed is:

1. A rotor braking device for a spinning reel that brakes a rotor rotatively mounted on a reel unit of the spinning reel in response to a pivoting of a bail arm that pivots between a line-winding position and a line-releasing position, said rotor braking device comprising:

a moving member that is coupled to the bail arm and provided on the rotor so as to be movable between a first position that corresponds to the line-winding position and a second position that corresponds to the line-releasing position, a part of said moving member projecting toward the reel unit when said moving member is in the second position; and a braking member that includes a drag portion and a plurality of engagement portions, said drag portion frictionally and relatively rotatably engaging with the reel unit, said plurality of engagement portions engaging with said projecting part of said moving member when said moving member is in the second position, said drag portion being frictionally rubbed against the reel unit when said projecting part of said moving member engages with one of said engagement portions.

2. The rotor braking device for a spinning reel set forth in claim 1, wherein said braking member is annular in shape, said drag portion is formed on an inner periphery of said braking member, and said engagement portions are formed on an outer periphery of said braking member.

3. The rotor braking device for a spinning reel set forth in claim 2, wherein said braking member is made of a plurality of constituent members, and said plurality of constituent members are press fitted to the reel unit by a spring member.

4. The rotor braking device for a spinning reel according to claim 1, wherein said moving member is rod-shaped, a front end of said moving member being bent toward a vicinity of a pivot center of the bail arm such that said front end extends along a pivot axis of the bail arm and is rotatably supported by the bail arm, a rear end of said moving member being bent toward a rotational axis of the rotor and being supported by the rotor so as to be movable back and forth, a portion of said moving member between said front end and said rear end being disposed so as to extend along the rotational axis of the rotor.

5. The rotor braking device for a spinning reel set forth in claim 1, wherein said braking member includes an elastic annular member which has a cut out portion, and said braking member is press fitted to the reel unit by the elasticity of said annular member.

6. The rotor braking device for a spinning reel set forth in claim 5, wherein said braking member further includes an elastic annular plate spring and a plurality of projections, said drag portion being formed on an inner periphery of said annular plate spring, said annular plate spring having a cut out portion formed thereon, said plurality of projections being provided on an outer periphery of said plate spring and extending radially outward therefrom, such that said projections form engagement portions.

7. The rotor braking device for a spinning reel set forth in claim 6, wherein each of said plurality of projections includes a first bent portion which is a portion that is bent radially outward at an outer periphery of said plate spring, and a second bent portion which is a portion bent from a tip of said first bent portion to extend along a rotational shaft of the rotor.

8. The rotor braking device for a spinning reel set forth in claim 7, further comprising an annular washer member that is disposed between said braking member and the reel unit, the tip of said first bent portion being bent toward the reel unit when said braking member is mounted on the reel unit.

9. The rotor braking device for a spinning reel according to claim 8, wherein said washer member has a plurality of tongue portions projecting toward an inner periphery of said washer ring member.

10. A spinning reel, comprising:

a handle;

a reel unit rotatably supporting said handle;

a rotor supported at a front of said reel unit so as to be rotatable about a rotational shaft, said rotor including a rotor unit, a bail arm mounted on a front of said rotor unit for pivoting between a line-winding position and a line-releasing position, and a bail tripping mechanism that is mounted to said rotor unit for turning said bail arm and includes a rotor brake mechanism, said rotor brake mechanism being for braking said rotor in response to a pivoting of said bail arm, said rotor brake mechanism including, a moving member that is coupled to said bail arm and provided on said rotor so as to be movable between a first position that corresponds to said line-winding position and a second position that corresponds to said line-releasing position, a part of said moving member projecting toward said reel unit when said moving member is in said second position; and a braking member that includes a drag portion and a plurality of engagement portions, said drag portion frictionally and rotatably engaging with said reel unit, said plurality of engagement portions engaging with said projecting part of said moving member when said moving member is in said second position, said drag portion being frictionally rubbed against said reel unit when said projecting part of said moving member engages with one of said engagement portions; and a spool disposed at a front of said rotor so as to be freely movable back and forth, said spool being configured to accommodate fishing line wound around an outer periphery thereof.

11. The spinning reel set forth in claim 10, wherein said braking member is annular in shape, said drag portion is formed on an inner periphery of said braking member, and said engagement portions are formed on an outer periphery of said braking member.

12. The spinning reel set forth in claim 11, wherein said braking member is made of a plurality of constituent members, and said plurality of constituent members are press fitted to said reel unit by a spring member.

13. The spinning reel according to claim 10, wherein said moving member is rod-shaped, a front end of said moving member being bent toward a vicinity of a pivot center of said bail arm such that said front end extends along a pivot axis of said bail arm and is rotatably supported by said bail arm, a rear end of said moving member being bent toward a rotational axis of said rotor and being supported by said rotor so as to be movable back and forth, a portion of said moving member between said front end and said rear end being disposed so as to extend along said rotational axis of said rotor.

14. The spinning reel set forth in claim 10, wherein said braking member includes an elastic annular member which has a cut out portion, and said braking member is press fitted to said reel unit by the elasticity of said annular member.

15. The spinning reel set forth in claim 14, wherein said braking member further includes an elastic annular plate spring and a plurality of projections, said drag portion being formed on an inner periphery of said annular plate spring, said annular plate spring having a cut out portion formed thereon, said plurality of projections being provided on an outer periphery of said plate spring and extending radially outward therefrom, such that said projections form engagement portions.

16. The spinning reel set forth in claim 15, wherein each of said plurality of projections includes a first bent portion which is a portion that is bent radially outward at an outer periphery of said plate spring, and a second bent portion which is a portion bent from a tip of said first bent portion to extend along said rotational shaft of said rotor.

17. The spinning reel set forth in claim 16, further comprising an annular washer member that is disposed between said braking member and said reel unit, the tip of said first bent portion being bent toward said reel unit when said braking member is mounted on said reel unit.

18. The spinning reel according to claim 17, wherein said washer member has a plurality of tongue portions projecting toward an inner periphery of said washer member.

19. The spinning reel according to claim 10, wherein said reel unit includes a reel body and a lid member, a flange portion and a cylindrical portion being further formed on a front of said reel body and said lid member, a groove being formed in said cylindrical portion, and said mounting member is mounted on said groove.

* * * * *